United States Patent
Soferman et al.

(10) Patent No.: US 7,533,075 B1
(45) Date of Patent: May 12, 2009

(54) SYSTEM AND METHOD FOR CONTROLLING ONE OR MORE SIGNAL SEQUENCES CHARACTERISTICS

(75) Inventors: Ziv Soferman, Givatayim (IL); Yohay Falik, Rananna (IL)

(73) Assignee: Emblaze Vcon Ltd, Ra'anana (IL)

( * ) Notice: Subject to any disclaimer, the term of this patent is extended or adjusted under 35 U.S.C. 154(b) by 999 days.

(21) Appl. No.: 10/661,718

(22) Filed: Sep. 11, 2003

(51) Int. Cl.
*G06F 9/44* (2006.01)
*G06N 7/02* (2006.01)
*G06N 7/06* (2006.01)

(52) U.S. Cl. .............. 706/52; 706/46; 706/14
(58) Field of Classification Search ........... 707/101
See application file for complete search history.

(56) References Cited

U.S. PATENT DOCUMENTS 6,075,819 A * 6/2000 Saw ............... 375/240
6,282,241 B1 * 8/2001 Saw ............... 375/240.01

OTHER PUBLICATIONS

George J. Klir et al., Fuzzy Sets and Fuzzy Logic, Theory and Applications, 1995, Cover and title page.*
Y. S. Saw, Quality-optimised MPEG2 video data rate control using fuzzy logic techniques, Jun. 1998, IEEE, 179-186.*
H. B. Kazemian, Fuzzy logic controllers for MPEG VBR transmission over ATM networks, Nov. 26, 2003, IEEE, 1920-1925.*
Bin Qiu et al., Fuzzy Multi-step Ahead Prediction of VBR Video Sources, 1997, IEEE, 1623-1626.*

* cited by examiner

Primary Examiner—Joseph P Hirl

(57) ABSTRACT

The invention provides controllers systems and methods that apply fuzzy logic techniques for determining signal sequence characteristics that propagate through a sequence of buffers. One of the buffers represents buffering characteristics of a network through which the signal sequence propagates. The signal sequence may include packets of a media stream and the network may include a wireless network.

82 Claims, 12 Drawing Sheets

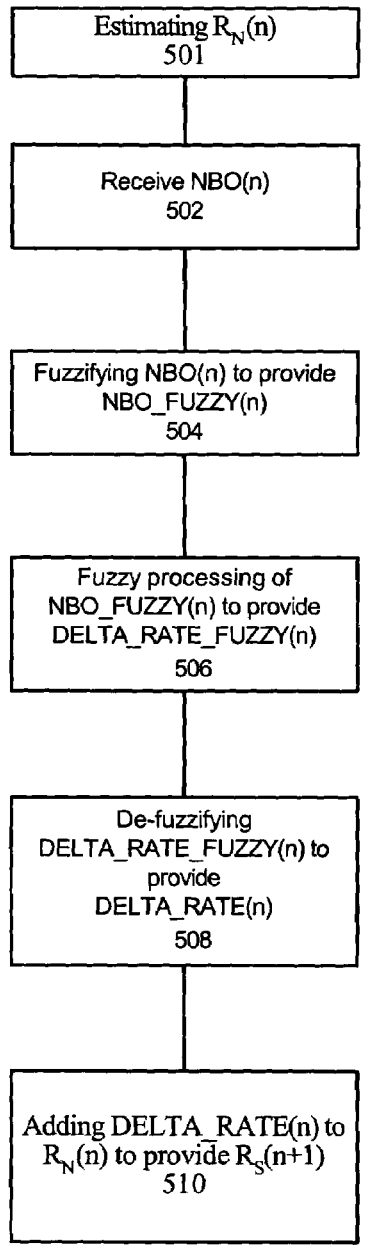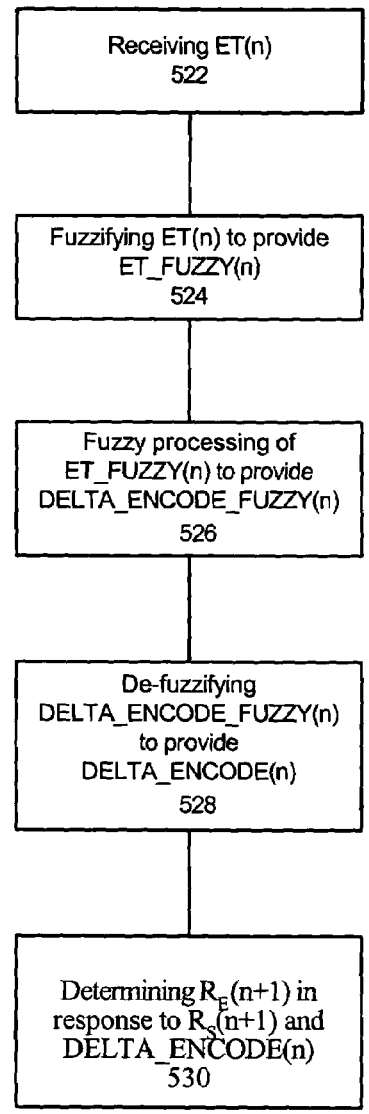
Figure 9a
Figure 9b

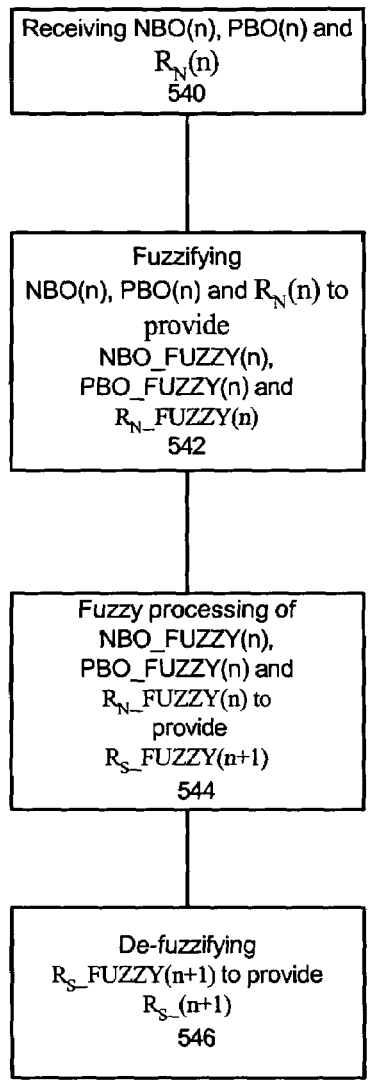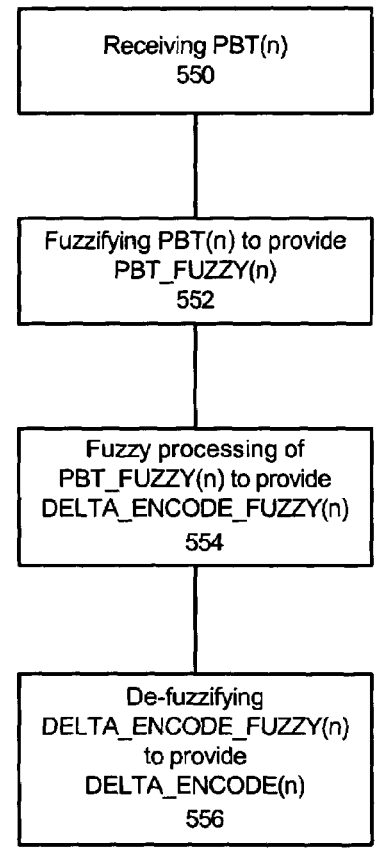
Figure 10a
Figure 10b

SYSTEM AND METHOD FOR CONTROLLING ONE OR MORE SIGNAL SEQUENCES CHARACTERISTICS

FIELD OF THE INVENTION

The invention relates to fuzzy logic based systems and method and especially systems and methods for controlling signal sequence characteristics of a signal sequence that propagates via multiple buffers.

BACKGROUND OF THE INVENTION

Digital video must be extensively compressed prior to transmission and storage, as each picture includes multiple pixels, and each pixel is associated with multiple multi-bit values.

In a typical scenario, a non-compressed media stream (also referred as "raw" media stream) includes a sequence of substantially equal frames. These frames are eventually presented at a constant rate. As described below, once the media stream is compressed, the size of frames may vary. The transmission of a varying size frame media stream over a network may cause timing problems, as these frames must be provided in a timely manner to a media player.

Various compression standards, such as but not limited to the MPEG standards enable efficient storage and transmission of media information.

Spatial compression usually includes transform coding, quantization and variable length encoding. Transform coding is operable to convert a group of picture pixels to a set of DCT (discrete cosine transform) coefficients, the DCT coefficients of a block (representative of a predefined amount of picture pixels, such as 8×8 pixels) are then quantized and are represented by pairs of amplitude/run-length, whereas the run-length value indicates the number of zeroes between two non-zero coefficients. The amplitude/run-length pairs of a macro-block are coded by a variable length-coding scheme to provide compressed video streams.

Temporal compression is based upon the fact that there is usually little difference between consecutive video frames. A compressed media stream includes many sequences of temporally compressed frames, each sequence initiates by a self-contained key-frame (that is independent of preceding frames) that is followed by several Inter-frames. Each Inter-Frame includes a difference between itself and at least another frame.

As a result of the compression schemes access units of complex scenes (for example, scenes of low temporal redundancy and/or low spatial redundancy) are represented by more bits than other access units. MPEG-4 presentations include a number of media elementary streams, such as video elementary streams and audio elementary streams. Each media elementary stream includes multiple access units (e.g.—samples). An access unit is a coded representation of a presentation unit. An audio access unit is the coded representation of an audio frame, while a video access unit includes the data required for presentation of a picture.

An MPEG-4 presentation may be provided to a client device in a streaming mode or in a download mode. A typical client device has a player buffer and a client player. In a download mode the presentation is stored at the client device memory (such as the client buffer) and can be later fetched from the memory and processed (by the client player) to enable the display of that presentation. In streaming mode the client device displays the streamed presentation. In the streaming mode, there is a need to match between the bit rates of the streaming elementary streams, the available bandwidth for streaming these elementary streams over a communication network and the client processing and/or buffering capabilities.

Mismatches may result in client buffer (also termed target buffer or player buffer) over-flow (in which the client device receives too much information and must throw away a part of the information) or in a client buffer under-flow (in which the client device does not receive enough information to enable a smooth and/or continuous display of the presentation). Furthermore, as various elementary streams are streamed to the client device, a bit-rate mismatch may result in loss of synchronization between ideally synchronized elementary streams. Typically, over-flow is easier to prevent.

Media streams can be transmitted over a network at a constant bit rate (CBR) or at a varying bit rate (VBR). CBR requires a compression of an access unit by a compression ratio ($Q_{SCALE}$) that is responsive to the size of that access unit, as larger access units must be compresses at a higher compression ration than smaller access units in order to achieve a substantially constant bit rate. VBR usually does not require such a relation between its compression ratio and the size of its access units, but may cause temporal timing and buffering problems.

Fuzzy Logic

Fuzzy logic is the logic of approximate reasoning. Fuzzy systems are usually used when a process is to complex to be modeled using conventional mathematical methods and/or when dealing with imperfect information.

According to the classical set theory an item either belongs to a set or not. Fuzzy set theory, on the other hand, introduced the concept of partial membership. Accordingly, a fuzzy logic variable can partially belong to more than one fuzzy set. The degree of membership can range between 0 and 1 and is defined by a membership function. Typical membership function are shaped as triangles or trapezoids, but this is not necessarily so.

A crisp input variable is converted to a fuzzy input variable by determining which rules out of a predefined set of rules are satisfied (to which fuzzy set does the crisp input value belongs) and to what degree (what is the degree of membership). A fuzzy logic variable is a linguistic expression.

The fuzzy input variables are processed by a rule-based decision process. The initial step of this process includes determining which rule were satisfied by the fuzzy input variables. The process takes into account the degrees of their fulfillment. These rules are expressed in linguistic form.

The output of the rule-based decision is one or more fuzzy output variables that are de-fuzzified to provide one or more crisp output variables.

A typical defuzzification step includes locating the "center of gravity" (centroid) of each satisfied rule and providing a weighted average of said centroids as a crisp output value. A less accurate but simpler defuzzification step may include arithmetic averaging of relevant rules instead of calculating the centroid.

U.S. Pat. No. 6,483,808 of Rochberger et al. describes a method of determining the optimum route from a source to a destination node in an ATM network utilizing fuzzy logic processing. The method is based on a set metrics that may or may not be related to each other. The fuzzy logic processing is divided into two phases each having its own set of rules that the input data is applied against. Fuzzy logic processing is performed for all candidate routes wherein the route chosen is the one having a maximum link quality.

U.S. Pat. No. 6,282,241 of Saw describes an apparatus for video rate control using a fuzzy logic rule-based control. The apparatus implements a fuzzy logic control scheme that determines a quantization scale of a video stream in response to various parameters such as (i) the occupancy of the apparatus buffer and the video stream quality; (ii) the apparatus buffer occupancy and the inter-frame variance of the video stream; or (iii) the amount of bits assigned to a part of a macroblock.

Four scientists from the University of Southern California developed a technique named "Multi Threshold Flow Control (MTFC)" that is described at "multi-threshold online smoothing technique for variable rate streams", R. Zimmerman, K. Fu, M. Jaharangiri and C. Shahabi". The article was found at the web site of the University of Southern California.

MTFC smoothes variable bit rate (VBR) transmissions from a server to a client, without a priori knowledge of the actual bit rate. MTFC utilizes multi-level buffer thresholds at the client side that trigger feedback information sent to the media server. Once a client buffer threshold is crossed it initiates a feedback process that in turn adjusts the sending rate of the server. The feedback process is based upon a prediction of futuristic bit rate consumption. Three bit rate consumption algorithms were suggested, one being a fuzzy logic based algorithm.

SUMMARY OF THE INVENTION

The invention provides a method for determining at least one signal sequence characteristic of a signal sequence that propagates through at least three cascaded buffers, the method includes a first step of providing status information reflecting a status of at least a third buffer and a second buffer of said at least three buffers. The first step is followed by a second step of applying at least one fuzzy logic process to determine the at least one signal sequence characteristic, in response to the status information.

The invention provides a method for determining multiple signal sequence characteristics of a signal sequence that propagates through at least two cascaded buffers, the method includes the steps of providing status information reflecting a status of at least two cascaded buffers; and applying at least one fuzzy logic process to determine multiple characteristics of the signal sequence, in response to the status information.

The invention provides a method for determining at least one signal sequence characteristic of a signal sequence that propagates through a network towards a target buffer. The method starts by a step of providing status information reflecting a status of at least the target buffer and a network buffer representative of the buffering characteristics of the network. This initial step is followed by a step of applying at least one fuzzy logic process to determine, in response to the status information, the at least one signal sequence characteristic.

The invention provides a controller for determining at least one signal sequence characteristic of a signal sequence that propagates through at least three cascaded buffers, the controller includes one or more fuzzy logic process blocks, each fuzzy logic process blocks includes a fuzzifying block, a fuzzy decision making block and a de-fuzzifying block. The fuzzifying block receives status information reflecting a status of at least a third buffer and a second buffer of the at least three cascaded buffers and fuzzifies the status information to provide fuzzified status information. The decision making block is connected between the fuzzifying block and a de-fuzzifying block, and is capable of processing the fuzzified status information to provide a fuzzified output representative of at least one signal sequence characteristic of the signal sequence. The de-fuzzifying block de-fuzzifyies the fuzzified output.

The invention provides a system for transmitting a signal sequence via an intermediate buffer towards a target buffer, the system includes: (i) a status information providing means, for providing status information reflecting a status of at least the target buffer and the intermediate buffer; (ii) a controller, coupled to the status information providing means, for applying at least one fuzzy logic process to determine at least one signal sequence characteristic, in response to the status information; and (ii) a signal sequence provider, for transmitting at least a signal sequence portion in response to the at least one signal sequence characteristic.

The invention provides a method and system that may includes a fuzzy logic process that is also responsive to network policy rules. The fuzzy logic process may be updated in response to previously determined characteristics. This update may be implemented by neural networks.

The invention provides a system for transmitting a signal sequence towards an intermediate buffer towards a target buffer, the system includes a status information providing means, for providing status information reflecting a status of at least the target buffer and the intermediate buffer; a controller, connected to the status information providing means, for applying at least one fuzzy logic process to determine at least one signal sequence characteristic, in response to the status information; and signal sequence provider, for transmitting at least a signal sequence portion in response to the at least one signal sequence characteristic.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 9a-9a, 10a-10b and 11 are flow charts diagrams of fuzzy logic processes, in accordance with embodiments of the invention.

DETAILED DESCRIPTION OF THE DRAWINGS

Figure 1:
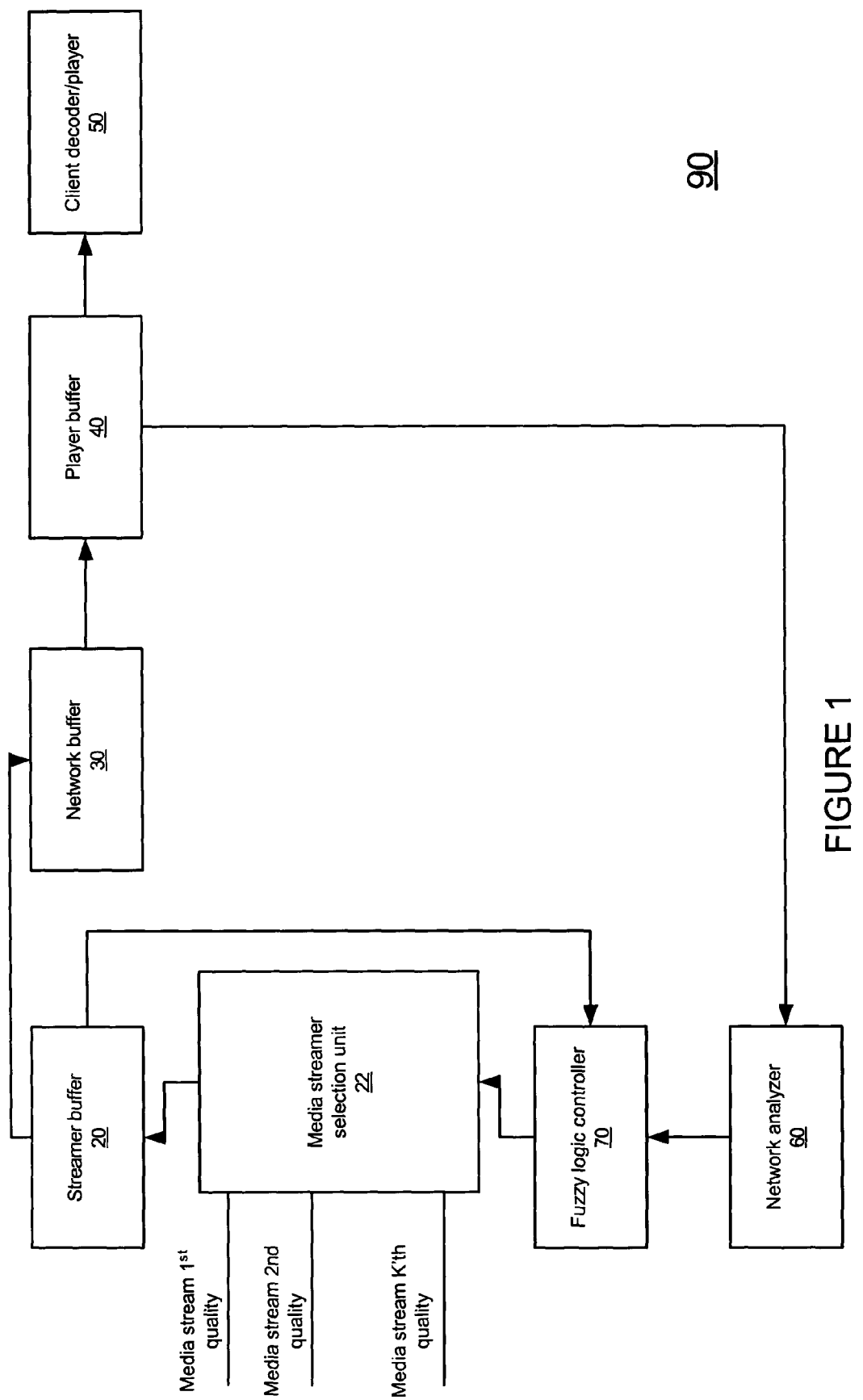
FIG. 1 is a schematic illustration of a model of a system for providing media streams to a client, in accordance with an embodiment of the invention.

The inventors observed that information relating to a propagation of signal sequence through a cascade of buffers (such as a media streams propagating through a buffering network towards a client buffer) is characterized with a certain amount of uncertainty. This uncertainty usually results from unknown timing differences between the generation of a status report (such as player buffer status report) and the reception and the processing of the status report by a controller. This uncertainty may, additionally or alternatively, result from a limited inherent inaccuracy of the reports themselves. For example, the status of the buffer may be updated only after a whole packet is received. Typically, the report is received every 1-2 seconds and includes information about packets that were fully received.

According to embodiments of the invention the signal sequence is a media stream that is streamed from a streamer buffer, through at least one network that has buffering characteristics, towards a client buffer. The client buffer is accessed by a media stream decoder that decodes the media streams in accordance with timing information such as presentation time stamps (PTS) embedded within the media stream packets. For convenience of explanation the drawing and the related description refer to these embodiments.

The inventors found that cellular networks such as GPRS network can be modeled by a backbone buffer and an access buffer, and that both buffers can be modeled as a single network buffer. The GPRS network is used to convey media streams over a cellular network to a client device such as a handset equipped with a client buffer and a player decoder that are connected to each other.

Various embodiments of the invention are based upon status reports sent from the player device. The reports may include details about media stream packets that were received by the player buffer and in some cases even the media stream packets that were retrieved from the player buffer. The streamer may store a table that includes information about transmitted media stream packets, such as ID, length and/or timestamps (such as Playing Time Stamp and Transmission Time stamp—transmittal time from the streamer buffer. This information may be transmitted periodically and/or in response to certain events. These reports enable estimation of network buffer status as well as player buffer status.

The inventors used a model of at least three cascaded buffers. According to an embodiment of the invention the first buffer, and especially its occupancy levels are irrelevant, thus a dual cascaded buffer model can be used. In the latter representation the third buffer of the three buffer model may become a second buffer of the dual buffer model, the second buffer of the three buffer model becomes the first buffer of the dual buffer model and the retrieval rate from the first buffer of the three buffer model becomes the provision rate to the first buffer of the dual buffer model. Thus a dual buffer model may include the network buffer (as the first buffer) and a client buffer (as a second buffer). The buffer of the streamer is omitted. It is also noted that the dual buffer model, as well as the three buffer model can be expanded to a model that include more than two or three buffers.

FIG. 1 illustrates a system 90 for providing media streams to a client, in accordance with an embodiment of the invention.

System 90 includes a network analyzer 60 that is connected to a player buffer 40 (also termed target buffer) and to a fuzzy logic controller (e.g.—"controller") 70. System 10 also includes a media stream selection unit 22 that is connected to controller 70, to streamer buffer 20 and to a source (not shown) of a media stream. The media stream source can provide media streams of different quality.

FIG. 1 illustrates a scenario in which the media stream source generates multiple versions of the same media stream. The versions may differ by their encoding level. It is noted that encoding levels are usually defined to comply with a certain bandwidth constraints and/or processing capabilities.

According to an embodiment of the invention each version may be independently processed, while according to other embodiments of the invention the media stream is represented by a basic level representation and one or more enhancement layers. An enhancement layer reflects the difference between a media stream of a certain compression level and the basic layer. If enhancement layers are used, the selection process involves selecting the basic layer and then one or more enhancement layers. It is noted that the invention can also be implemented in conjunction with various encoding methods, such as but not limited to MDC (multiple descriptive coding), in which a certain content is encoded to provide multiple representations of said content. Each representation may be used to reconstruct the content, but if multiple representations are provided to an encoder the quality of the reconstructed content is improved. MDC is known in the art, thus does not need additional description.

The method is also capable of being implemented with yet further coding schemes. For example, encoding separate components of a media stream in different manners. These components may include background, video, audio, 3D animation etc. each component is encoded separately. In such a scenario the "encoding level" is implemented in a broader sense namely, the more bandwidth is available, the more components are transmitted, or else they are just omitted.

According to other embodiments of the invention the media stream is represented by various versions, these version may vary by their size, but the size difference may result from various processing steps that differ than compression. For example, they may differ by their error correction characteristics. At least one version of the media stream may be larger than the media stream itself.

The media streamer selection unit 22 selects which version to send to the streamer buffer 20. The decision is made either periodically and/or in response to predefined events.

When such a selection involves switching between versions of a media stream. There are various prior art methods for seamless switching that may be utilized. One being switching at independently decodable frames, such as MPEG key frames. According to an another embodiment of the invention the switch can be made at arbitrary points of the media stream, by using the system and methods that is described at U.S. patent application Ser. No. 10/209,889 titled "Scalable Multi-level video coding", filed at 2 Aug. 2002 that is incorporated herein.

According to an embodiment of the invention the media stream source does not provide multiple versions of the same media streams but is capable of changing the encoding level of a media stream in response to control signals from fuzzy logic controller. In this embodiment the media stream selection unit 22 may be omitted, as the switching operation is replaced by encoding operations executed by the source. It is noted that according to an embodiment of the invention the encoding levels may be continuous rather then discrete. Such change in encoding level can be found in live encoding or FGS-fine granularity scalability in MPEG-4 standard.

Streamer buffer 20, network buffer 30 (also termed intermediate buffer) and player buffer 40 are connected to each other to provide a cascade of buffers. Media stream packets are sent to the streamer buffer 20 from unit 22 are later retrieved from the streamer buffer 20 at a streaming rate denoted $R_S(n)$, whereas index n is a positive integer. These packets are received by at least one network that is modeled by network buffer 30, to be retrieved at a network rate denoted $R_N(n)$. The media stream packets are received at the player buffer 40 to be retrieved to a client decoder/player 50 according to timing information associated with these packets.

The media stream selection unit 22 and the streamer buffer 20 form a signal sequence provider, for transmitting media stream packets in response to the outputs from fuzzy logic controller 70. As mentioned above, the media streamer selection unit 22 may be replaced by media encoders/compressors.

It is noted that although FIG. 1 describes a media stream selector 22 that receives fully processed (or otherwise fully encoded) versions of the media streams and selects one of the versions, this is not necessarily so. According to an embodiment of the invention part of the media stream can be stored in a compressed form while the other provided to a compressor (or encoder)(not shown) during the retrieval of the compressed part. According to yet another embodiment of the invention, the media stream versions can be stored in a partially compressed form, to be fully compressed during the selection and transmission steps. A partially compressed media stream can include a media stream that is associated with motion vectors, but this is not necessarily so.

First Embodiment

According to a first embodiment of the invention a first fuzzy logic control scheme is provided. This control scheme aims to maintain the network buffer slightly filled (almost empty) and maintain the player buffer partially full. In such a state packets that enter the network buffer 30 are not unduly delayed, and the chances of player buffer overflow or underflow are reduced. The player buffer has to be about half full, but this is not necessarily so. It is noted that avoiding network buffer overflow is of higher priority than preventing network buffer underflow.

The first fuzzy logic control scheme includes two fuzzy logic processes. The first process receives as crisp input information representative of the occupancy of the network buffer and outputs a crisp output variable representative of a change in the streaming rate.

The second process receives as crisp input information relating to the status of packetized media streams that were transmitted from the media streamer and outputs a crisp output variable representing an encoding level of media stream.

Figure 2:
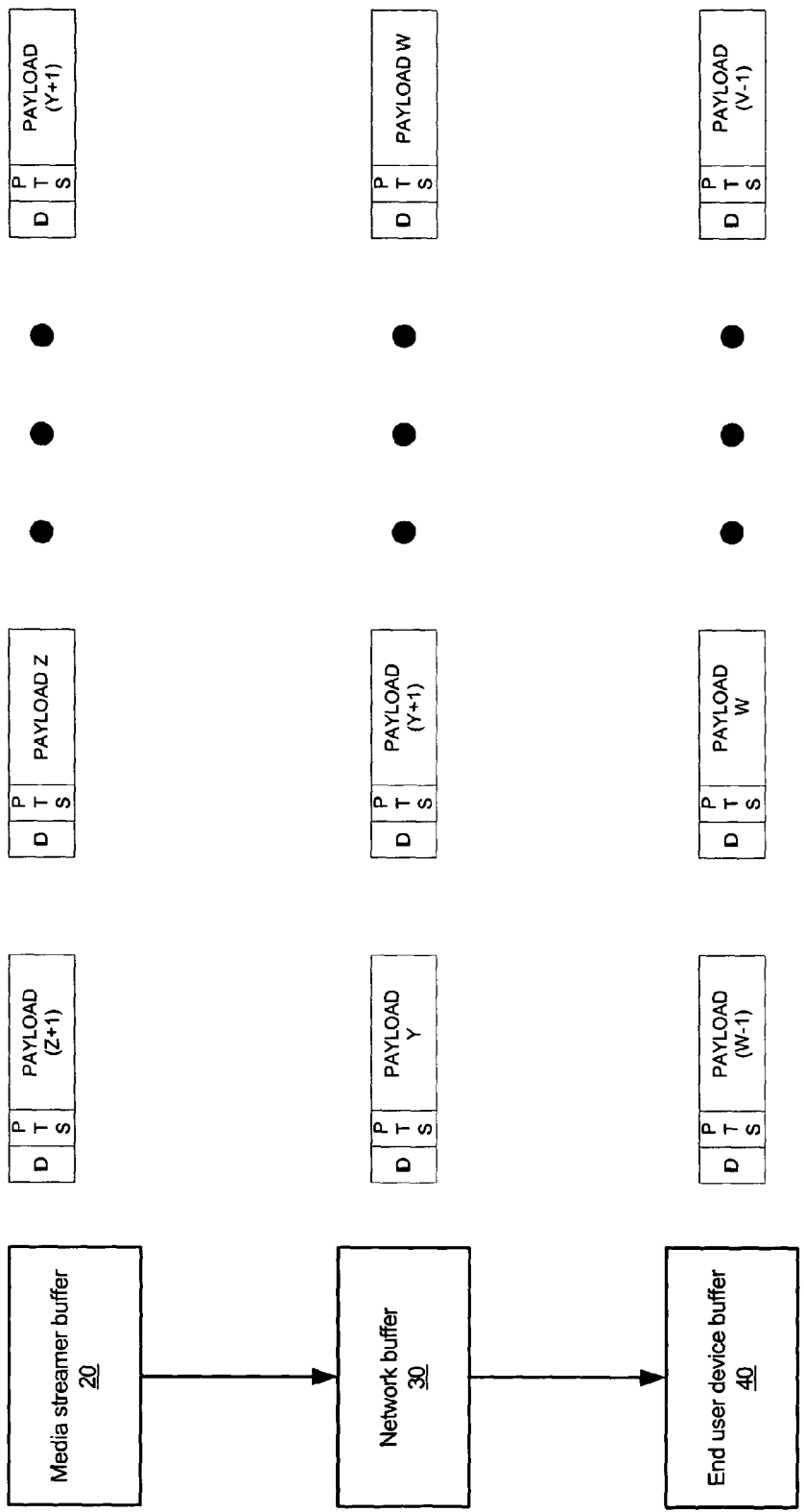
FIG. 2 is a schematic illustration of an exemplary status of packets within a streamer buffer, a network buffer and a player buffer, in accordance with an embodiment of the invention.

FIG. 2 illustrates an exemplary status of media stream packets within streamer buffer 20, network buffer 30 and player buffer 40. Streamer buffer 20 stores the $(Z+1)^{th}$–$(Y+1)^{th}$ packets of the media stream. Network buffer 30 stores the $Y^{th}$–$W^{th}$ packets of the media stream. Player buffer 40 stores the $(W-1)^{th}$–$(V-1)^{th}$ packets of the media stream. The client player/encoder currently processes the $(V-2)^{th}$ packet of the media stream. Each media stream packet includes an identification field (denoted ID) and a timing information field (denoted PTS).

As illustrated in FIG. 1, the player buffer 40 (or other client device entity) transmits to the network analyzer 60 a status report relating to the media stream packets that are stored within player buffer 40. This report may include the ID of the last packet that was buffered (such as W−1, in the case illustrated in FIG. 2), or the PTS of that packet ($PTS_{W-1}$), the ID of the packet that was last sent to the player (V−2). The report may include only a portion of said information but may also include additional information. Usually, either the packet ID or PTS are transmitted, as the streamer is aware of the mapping between them.

Those of skill in the art will appreciate that other report formats may provide adequate information, such as transmitting the occupancy of the player buffer or a representation of said occupancy (for example a buffer occupancy threshold that is passed). For simplicity of explanation it is assumed that the ID of last buffered packet is transmitted and its corresponding timing is known (it is either transmitted by the client buffer or stored within the streamer before it is transmitted over the network).

Figure 3:
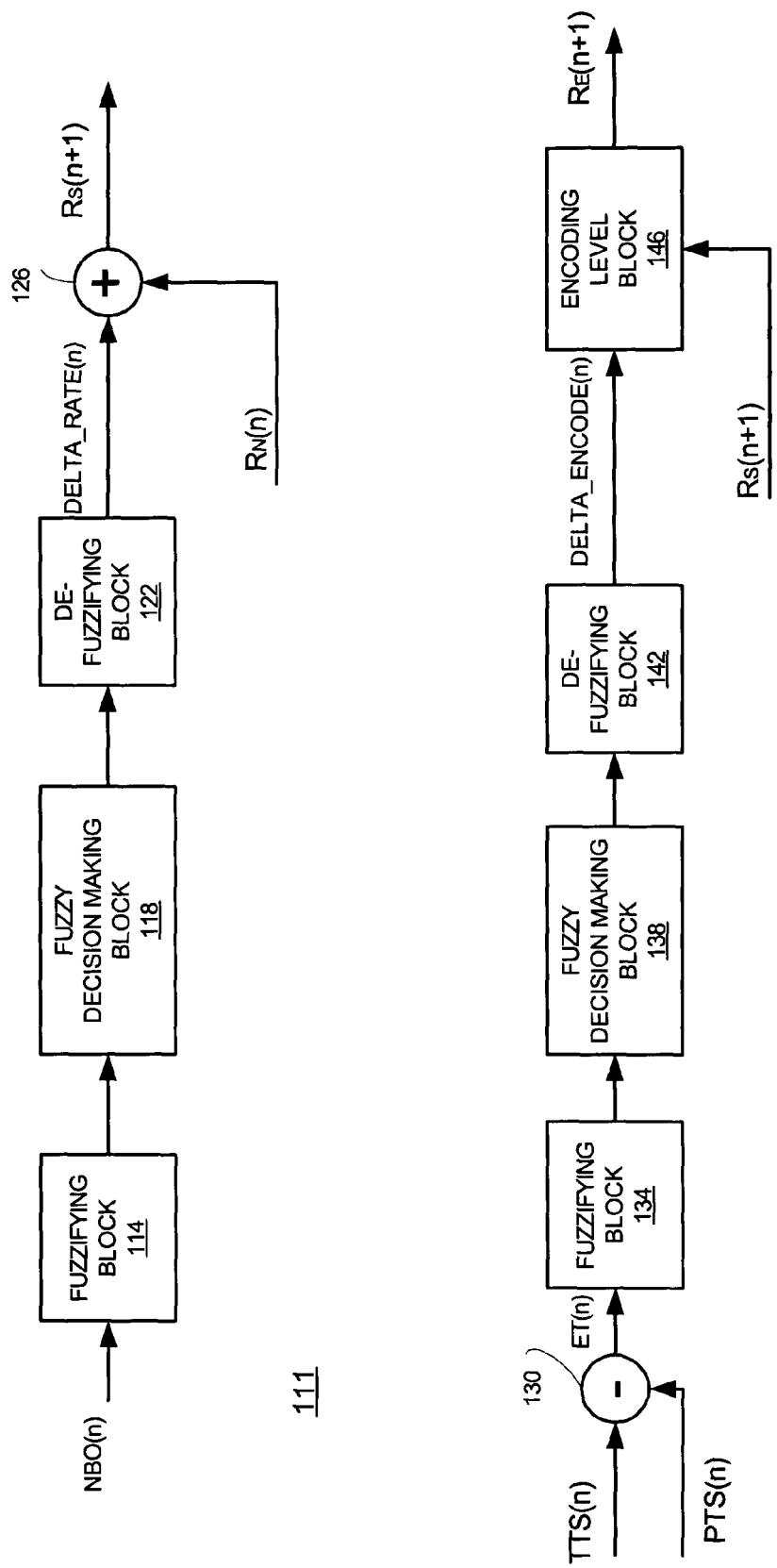
FIG. 3 is a detailed schematic illustration of two fuzzy logic processes, in accordance with an embodiment of the invention.

We now refer to FIGS. 3, 9a and 9b that illustrate in greater details the two mentioned above fuzzy logic processes.

The first process 111 (of FIG. 3) receives (step 502 of FIG. 9a) a crisp input variable NBO(n) representing the current occupancy of network buffer 30, as estimated from the difference between the next packet that is supposed to be received at the player buffer 40 (driven from client buffer status reports) and the last packet that was sent from the streamer buffer 20. The process is executed in intervals and "n" is a positive integer that denotes a serial number of an interval. Referring to FIG. 2, this difference is responsive to the aggregate size of the $Y^{th}$-$W^{th}$ media stream packets. The network buffer occupancy may also be defined in response to timing information associated with the media packets that it stores. For example, it may reflect the difference ($PTS_{W-1}$–$PTS_{V-1}$) between the PTS of the $(W-1)^{th}$ packet and the PTS of the $(V-1)^{th}$ packet.

Conveniently, the occupancy of the network buffer is expressed in relation to five equally spaced occupancy thresholds. It is noted that the amount of thresholds, the space between each pair of thresholds may vary.

Figure 4A:
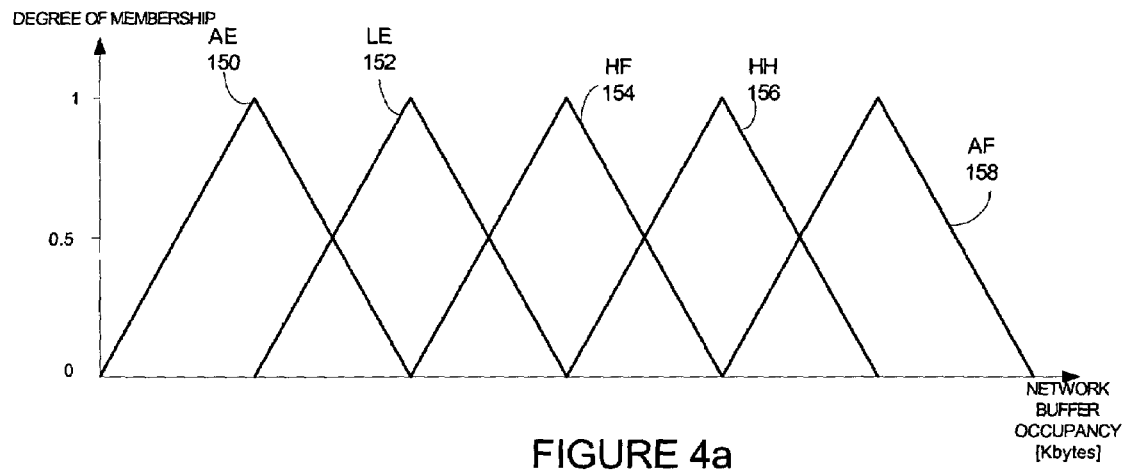
FIGS. 4a-4d illustrate various membership functions, in accordance with an embodiment of the invention.

NBO(n) is fuzzified (step 504 of FIG. 9a) by fuzzifying block 114 that applies membership functions, such as membership functions AE (almost empty 150 of FIG. 4a), LH (lower than half 152 of FIG. 4a), HF (half full 154 of FIG. 4a), HH (higher than half 156 of FIG. 4a), and AF (almost full 158 of FIG. 4a). Fuzzifying block 114 provides to fuzzy decision making block 118 a fuzzy input variable NBO_FUZZY(n).

These membership functions are illustrated in FIG. 4a as symmetrical triangles, each having equal negative and positive slopes. It is noted that other shapes may be selected and that the membership functions may differ from each other.

NBO_FUZZY(n) is processed (step 506 of FIG. 9a) by fuzzy decision block 118 to provide an fuzzy output variable DELTA_RATE_FUZZY(n). The relationship between NBO_FUZZY(n) and DELTA_RATE_FUZZY(n) is illustrated at table 1:

TABLE 1

| NBO_FUZZY(n) | DELTA_RATE_FUZZY(n) |
|---|---|
| AE | LPRC |
| LH | SPRC |
| HF | ZRC |
| HH | SNRC |
| AF | SPRC |

The output variable DELTA_RATE_FUZZY(n) is de-fuzzified (step 508) by using, for example, a centroid and weighted average methods to provide a crisp output variable DELTA_RATE(n) representative of a difference between the next streaming rate and the current network rate.

Figure 4B:
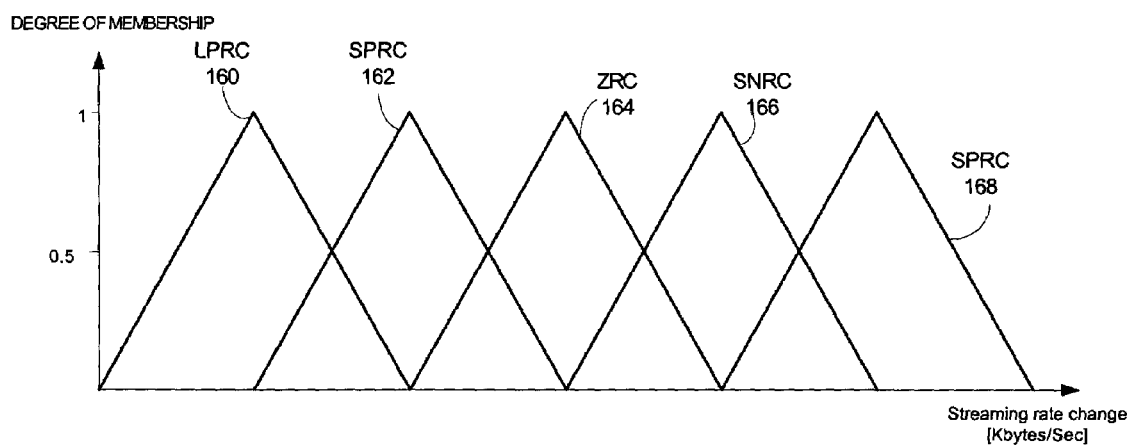

FIG. 4b illustrates the membership functions of output variable DELTA_RATE_FUZZY(n): LPRC (large positive rate change 160), SPRC (small positive rate change 162), ZRC (zero rate change 164), SNRC (small negative rate change 166), and LNRC (large negative rate change 168).

DELTA_RATE(n) is added (step 510), by adder 126, to the current network rate $R_N(n)$ to provide the next streaming rate $R_S(n+1)$.

The current network rate $R_N(n)$ can be estimated (step 501 of FIG. 9a) in various manners. For example, it may substantially equal a ratio between (a) the aggregate size of packets transmitted over the network during a predefined time window and (b) the length of that time window. Referring to FIG. 2, and assuming that a large enough time window was selected to include the transmission of the $(W-1)^{th}$ till the $(V-1)^{th}$ packets then $R_N(n)=[SIZE((W-1)^{th}\text{ packet})+ \ldots + SIZE((V-1)^{th}\text{ packet})]/[TA_{(V-1)}-TA_{(W-1)}]$, whereas TA are the arrival time of the packets to the player buffer. It is noted that shorter time windows may be selected, and that other methods for estimating $R_N(n)$ are known.

The second process 131 (of FIG. 3) receives (step 522 of FIG. 9b) as a crisp input variable a difference ET(n) between a presentation time stamp of a media packet that was transmitted from the streamer buffer (usually the last media packet that was transmitted from the streamer packet) and between the transmission stamp of the media packet(TTS). Subtracting unit 130 performs the subtraction and provides ET(n).

It is noted that ET(n) may also be responsive to buffering periods-periods in which the player device requested to receive packets but did not receive as the player buffer was empty.

The buffering periods can be estimated by comparing successive player reports to identify successive reports in which the last received packet remains the same.

Input variable ET(n) is fuzzified (step 524 of FIG. 9b) to provide fuzzy variable ET_FUZZY(n), by fuzzifying block 134 by means of applying membership functions. An exemplary set of such membership functions is illustrated at FIG. 4a and includes: BSR (below streaming rate 170), ESR (approximately equal to streaming rate 172) and ASR (above streaming rate 174).

Fuzzy Variable ET_FUZZY(n) is processed (step 526 of FIG. 9b) by fuzzy decision block 138 to provide a fuzzy output variable DELTA_ENCODE_FUZZY(n). The relationship between E_FUZZY(n) and DELTA_ENCODE_FUZZY(n) is illustrated at table 2:

TABLE 2

| ET_FUZZY(n) | DELTA_ENCODE_FUZZY(n) |
|---|---|
| BT | BSR |
| WT | ESR |
| AT | ASR |

The output variable DELTA_ENCODE_FUZZY(n) is defuzzified (step 528 of FIG. 9b) by using, for example a centroid and weighted average methods to provide a crisp output variable DELTA_ENCODE(n).

DELTA_ENCODE(n) and the next streaming rate $R_S(n+1)$ are provided to an encoding level block 146 (of FIG. 3) that determines (Step 530 of FIG. 9b) what shall be the next encoding level $R_E(n+1)$.

According to an embodiment of the invention $R_E(n+1)=R_S(n+1)+DELTA\_ENCODE(n)$. According to another embodiment the encoding level block 146 selects the encoding level, out of a set of possible levels, in response to said sum. This may include finding the best matching encoding level.

According to an embodiment of the invention the difference between $R_E(n+1)$ and $R_E(n)$ is limited. According to another embodiment of the invention the process may select between an encoding level out of a sequence of encoding levels. Once a certain encoding level is selected during a certain step the process cannot select during a consecutive step an encoding level that is too distant than that encoding level.

Second Embodiment

According to this embodiment a second fuzzy logic control scheme is provided. This scheme is responsive to the occupancy of the player buffer. The occupancy can be in terms of aggregate packet size or in aggregate playing time associated with the packets.

Figure 5:
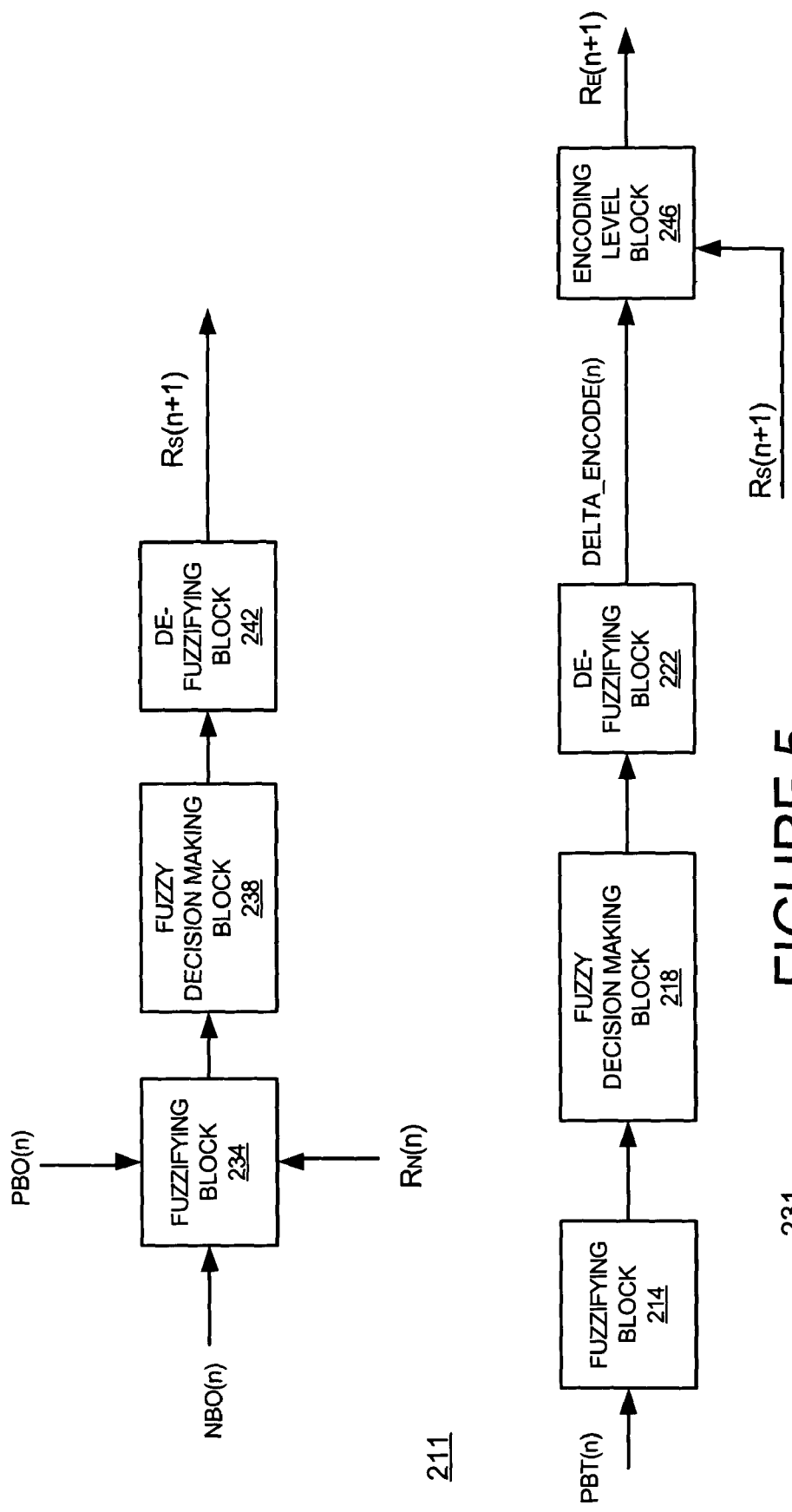
FIG. 5 is a detailed schematic illustration of fuzzy logic processes, in accordance with another embodiment of the invention.

The second fuzzy logic control scheme includes two fuzzy logic processes, both are illustrated at FIG. 5.

The first process 211 of FIG. 5 receives (step 540 of FIG. 10a) as crisp input the network buffer occupancy NBO(n), the network bit rate $R_N(n)$ and the player buffer occupancy PBO(n). It outputs a crisp output representative of the next streaming rate.

The second process 231 of FIG. 5 receives as input the aggregate playing time of packets within the player buffer PBT(n) and outputs the encoding level of the media stream $R_E(n+1)$.

Referring back to the first process 211, NBO(n) is fuzzified (step 542 of FIG. 10a), by fuzzifying block 234, to provide fuzzy input variable NBO_FUZZY(n). Fuzzifying block 234 applies membership functions such as AE (almost empty 150), LH (lower than half 152), HF (half full 154), HH (higher than half 156), and AF (almost full 158). These exemplary membership functions are illustrated at FIG. 4a.

Figure 4C:
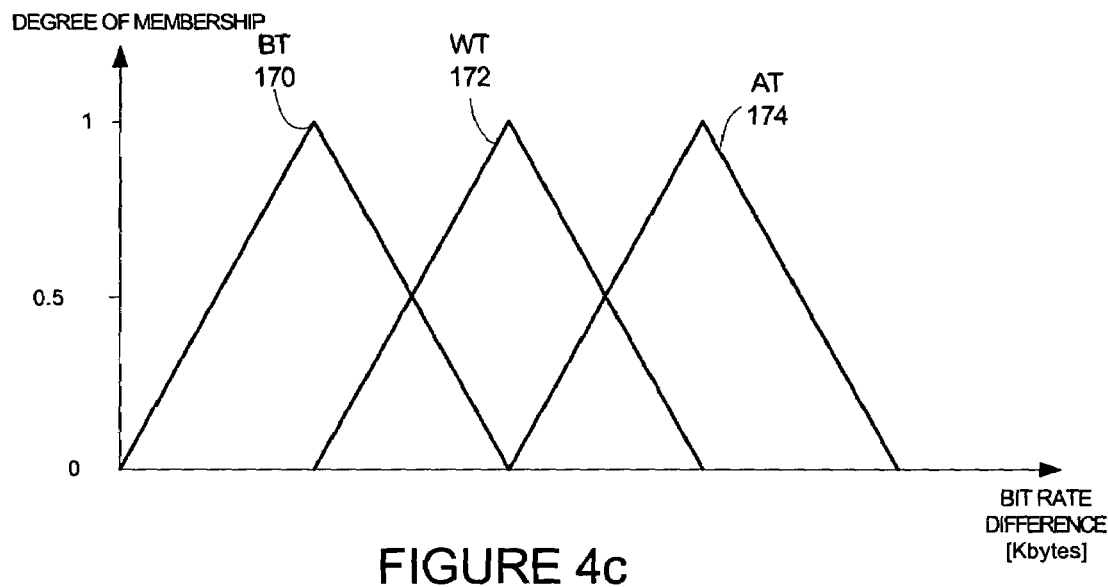
Figure 4D:
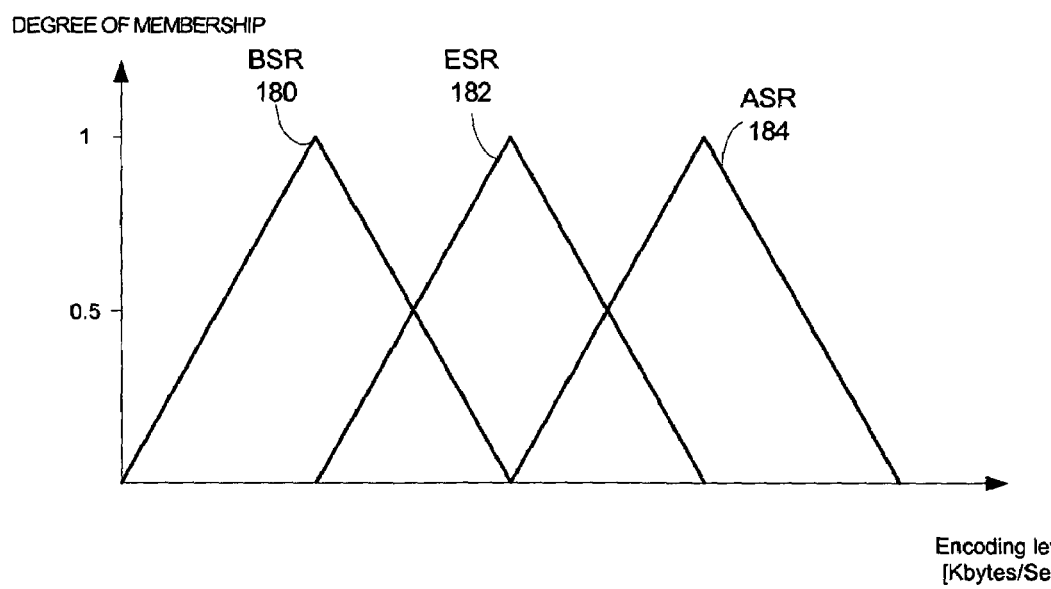

$R_N(n)$ is fuzzified (step 542 of FIG. 10a), by fuzzifying block 234 (of FIG. 5), to provide fuzzy input variable $R_N$_FUZZY(n). Fuzzifying block 234 applies membership functions such as $VLR_N$(very low network rate 170 of FIG. 4c), $MLR_N$ (medium-low network rate 172), $MR_N$ (medium network rate 174), $MHR_N$ (medium-high network rate 176 of FIG. 4c) and $VHR_N$ (very high network rate 178 of FIG. 4c).

Figure 7:
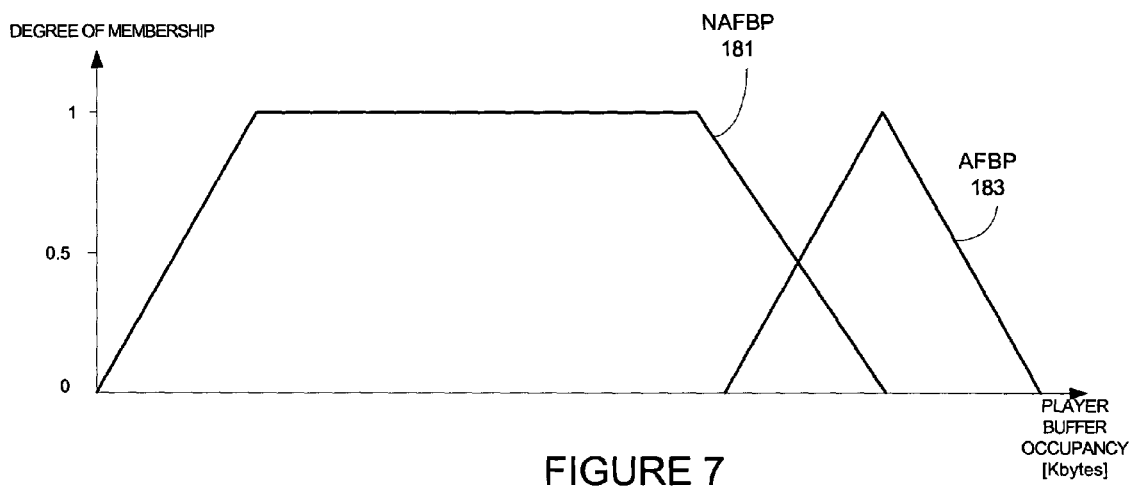
FIG. 7 illustrates various membership functions, in accordance with an embodiment of the invention.

PBO(n) is fuzzified (step 542 of FIG. 10a), by fuzzifying block 234, to provide fuzzy input variable PBO_FUZZY(n). Fuzzifying block 234 may apply membership functions such as NAFPB (Not Almost Full Player Buffer 181 of FIG. 7) and AFPB(Almost Full Player Buffer 183 of FIG. 7).

Fuzzy input variables NBO_FUZZY(n), $R_N$_FUZZY(n) and PBO_FUZZY(n) are sent to fuzzy decision making block 238. The fuzzy decision making block 238 processes the fuzzy input variables (step 544 of FIG. 10a) to provide fuzzy output variable $R_S$_FUZZY(n+1). $R_S$_FUZZY(n+1) may have the following values: $VLR_S$ (very low streaming rate), $MLR_S$ (medium low streaming rate), $MR_S$ (medium streaming rate), $MHR_S$ (medium high streaming rate) and $VHR_S$ (very high streaming rate).

An exemplary decision making process is described by TABLE 3 (for cases where the player buffer is not almost full) and by table 4 (for cases where the player buffer is almost full). It is noted that in many cases (as defined by the overlap between membership functions 180 and 182) the level of the player buffer can be considered as both almost empty and not almost empty.

TABLE 3

| $R_N$_FUZZY(n)/ NBO_FUZZY(n) | $VLR_N$ | $MLR_N$ | $MR_N$ | $MHR_N$ | $VHR_N$ |
|---|---|---|---|---|---|
| AE | $MR_S$ | $MHR_S$ | $MHR_S$ | $VHR_S$ | $VHR_S$ |
| LH | $MR_S$ | $MR_S$ | $MHR_S$ | $MHR_S$ | $VHR_S$ |
| HF | $VLR_S$ | $MLR_S$ | $MR_S$ | $MHR_S$ | $MHR_S$ |

TABLE 3-continued

| $R_N\_FUZZY(n)/$ NBO_FUZZY(n) | $VLR_N$ | $MLR_N$ | $MR_N$ | $MHR_N$ | $VHR_N$ |
|---|---|---|---|---|---|
| HH | $VLR_S$ | $MLR_S$ | $MLR_S$ | $MR_S$ | $MR_S$ |
| AF | $VLR_S$ | $VLR_S$ | $MLR_S$ | $MLR_S$ | $MR_S$ |

TABLE 4

| $R_N(n)\_FUZZY/$ NBO(n)_FUZZY | $VLR_N$ | $MLR_N$ | $MR_N$ | $MHR_N$ | $VHR_N$ |
|---|---|---|---|---|---|
| AE | $MLR_S$ | $MR_S$ | $MR_S$ | $MHR_S$ | $MHR_S$ |
| LH | $MLR_S$ | $MLR_S$ | $MR_S$ | $MR_S$ | $MHR_S$ |
| HF | $VLR_S$ | $VLR_S$ | $MLR_S$ | $MR_S$ | $MR_S$ |
| HH | $VLR_S$ | $VLR_S$ | $VLR_S$ | $MLR_S$ | $MLR_S$ |
| AF | $VLR_S$ | $VLR_S$ | $VLR_S$ | $VLR_S$ | $MLR_S$ |

Fuzzy output variable $R_S\_FUZZY(n+1)$ is de-fuzzified (step 546 of FIG. 10a) by de-fazzifying block 242 that provides a crisp output variable $R_S(n+1)$—the next streaming rate.

The second process 231 of FIG. 5 receives (step 550 of FIG. 10b) a crisp input variable PBT(n) reflecting the aggregate playing time associated with packets that are stored in the player buffer. Referring to FIG. 2 this aggregate playing time may substantially equal $PTS_{W-1}-PTS_{V-1}$.

Input variable PBT(n) is fuzzified (step 552 of FIG. 10b) to provide fuzzy variable PBT_FUZZY(n), by fuzzifying block 214 that applies membership functions, such as triangular shaped membership functions BT(below threshold), ESR (approximately equal to threshold) and ASR (above threshold).

Fuzzy Variable PBT_FUZZY(n) is processed (step 554 of FIG. 10b) by fuzzy decision block 218 to provide a fuzzy output variable DELTA_ENCODE_FUZZY(n).

The relationship between PBT_FUZZY(n) and DELTA_ENCODE_FUZZY(n) is illustrated at table 5:

TABLE 5

| PBT_FUZZY(n) | ENCODE_LEVEL_FUZZY(n) |
|---|---|
| BT | BSR |
| WT | ESR |
| AT | ASR |

The fuzzy output variable DELTA_ENCODE_FUZZY(n) is de-fuzzified (step 556 of FIG. 10b) by using a centroid and weighted average methods to provide a crisp output variable DELTA_ENCODE(n). DELTA_ENCODE(n) and the next streaming rate $R_S(n+1)$ are provided to an encoding level block 246 that determines what shall be the next encoding level $R_E(n+1)$.

According to an embodiment of the invention $R_E(n+1)=R_S(n+1)+DELTA\_ENCODE(n)$. According to another embodiment the encoding level block 246 selects the encoding level, out of a set of possible levels, in response to said sum.

Third Embodiment

In this embodiment the fuzzy logic control scheme is responsive to the status of the streaming process and especially to whether the streaming process approached starts, ends or is in an intermediate state.

The inventors found out that the state of the buffers, and especially the player buffer, may be altered during the streaming process. When the streaming process begins it is desirable to allow a fast and smooth start of the presentation at the client device, rather than waiting till a certain amount (usually in terms of playing time) of media stream packets are stored in the player buffer, before initiating the presentation. This goal may be achieved by reducing the encoding level of the media stream at the beginning of the streaming process.

Typically, when the streaming process ends, the player buffer still stores packets to be played. Thus, before the playing session ends the network is not used to convey media stream packets. In order to improve the utilization of the network, the amount of information that is transmitted may be increased. This increase can serve to improve the quality of the media stream, whereas said improvement can be allocated to media stream portions of various length. Assuming that a certain amount of information increment is provided than it may be used to improve the quality of certain media stream portions. This increment can be used to transfer higher quality media streams. The quality level as well as the length of the quality enhanced media stream may be increased. Higher quality level improvements are associated with shorter media stream portions (shorter time periods) and vise verse. It is desirable to have large information increments, for allowing improved media stream quality. Nevertheless, the amount of information increment is limited by the network capability, and especially whether the network can guarantee a transmission of relatively more information (higher bit rates) during extended periods. In other words, by allocating more bits to the last packets of a media stream (or in other words, by increasing the encoding level of the media stream) the network is kept busy almost till the end of the playing process of the media stream packets at the player. Thus, the player buffer can be emptied towards the end of the streaming session, so that the network will be still used to transfer data/packets until the data is played almost in its entirety.

This can be achieved by modifying a target player buffer occupancy level and actually reducing said occupancy level towards the end of the streaming session. As a result of said target occupancy level reduction the "idle" period in which the network is not utilized for conveying media stream packets is reduced.

The player buffer occupancy level can not be reduced to a point that there is a good chance of buffering due to fluctuations, or temporary reductions in the available network bandwidth.

The inventor found out that a tradeoff between possible buffering and utilization of possible bandwidth increment shall be found. This tradeoff depends upon the network stability as if there are almost no fluctuations the risk of buffering is low, even when the player buffer is almost empty for a long period. Another factor that must be taken into account is the length of time period during which the player buffer occupancy is low. Longer time periods may increase the risk of buffering.

The ability to effectively utilize any possible bandwidth increment may be based upon effective fuzzy logic control schemes, such as those that are described below.

An advantage of this embodiment is the capability of utilizing the buffer occupancy levels to increase the effective bandwidth of the network that is allocated to the streaming process (which can also be viewed as the effective bandwidth of the streaming process).

Stable networks allow better prediction of their capability to provide a certain bit rate during longer time periods. The fuzzy logic control process takes into account a risk factor that reflects the stability of the network.

A sequence (denoted 334 in FIG. 6) of two fuzzy logic processes (330 and 332) is used to determine the encoding level of a streaming media stream.

The first process 330 receives crisp input variable SST(n) that reflects the status of the streaming process and as well as a risk level attribute RL(n) that reflects the network capability to stream media stream at certain rates, especially in a stable manner. Process 330 outputs a crisp output TPBT(n) that represents a target aggregate playing time associated with packets that are stored in the player buffer.

TPBT(n) is used as a crisp input into the second process 332 that outputs a crisp output representative of the difference between the next streaming rate and a required encoding level.

Figure 6:
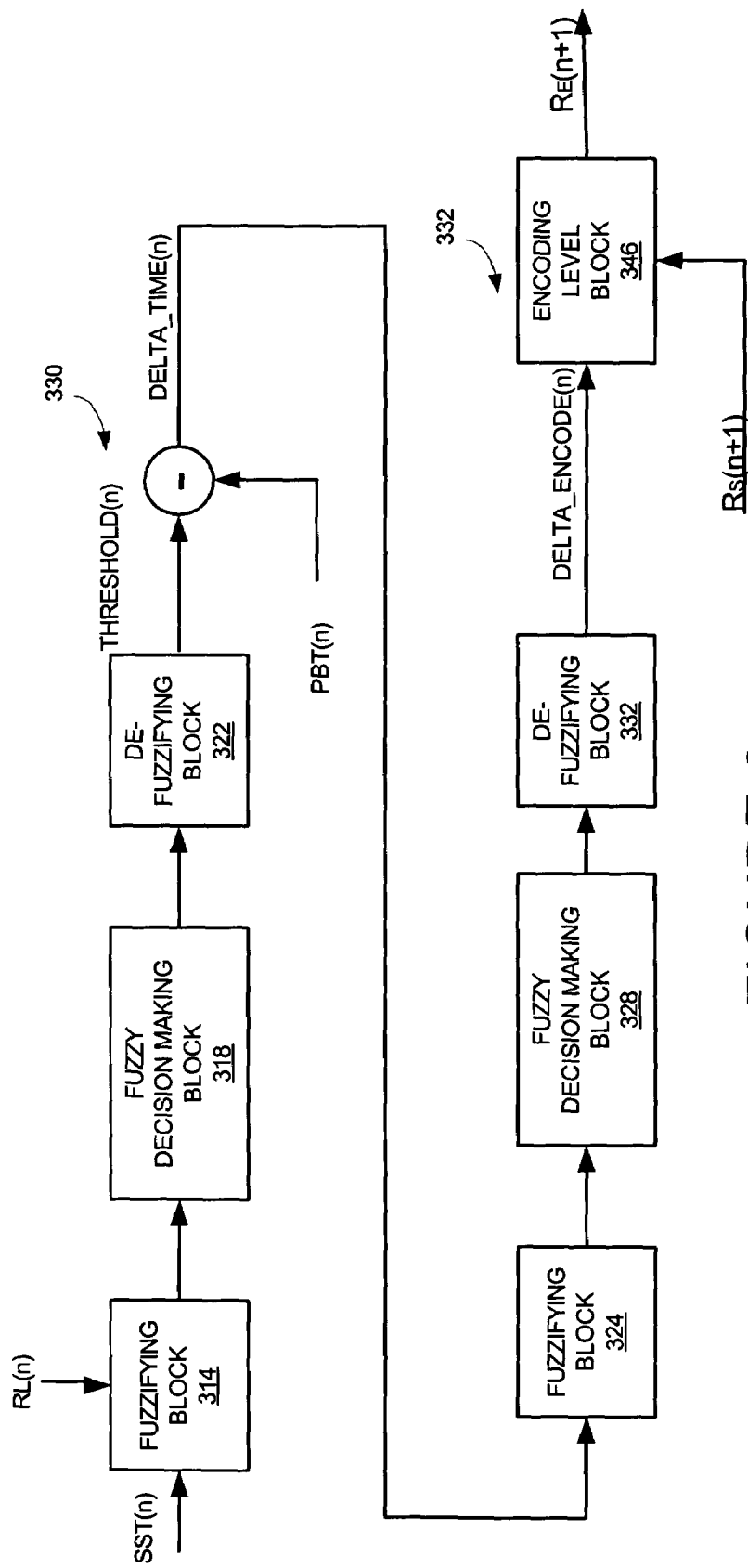
FIG. 6 is a detailed schematic illustration of fuzzy logic processes, in accordance with a further embodiment of the invention.
Figure 8B:
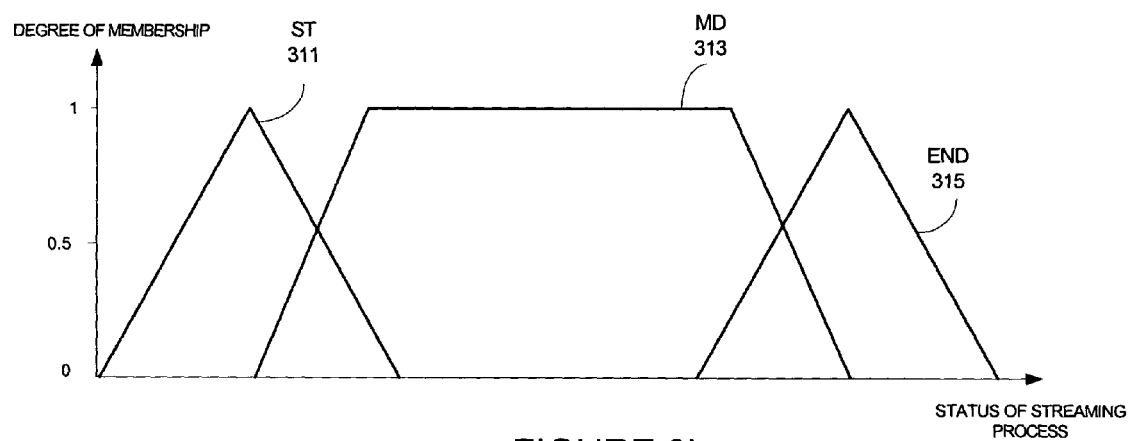
FIGS. 8a-8b illustrates various membership functions, in accordance with an embodiment of the invention.
Figure 8A:
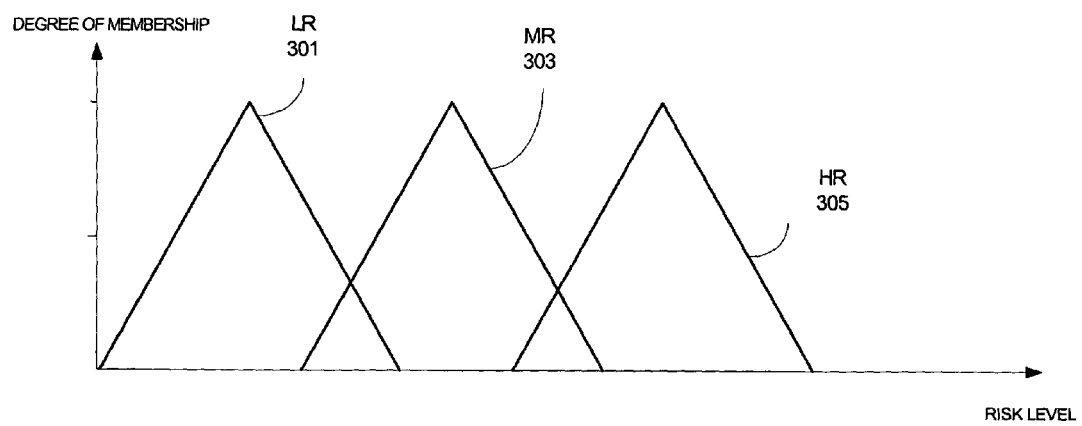
Figure 11:
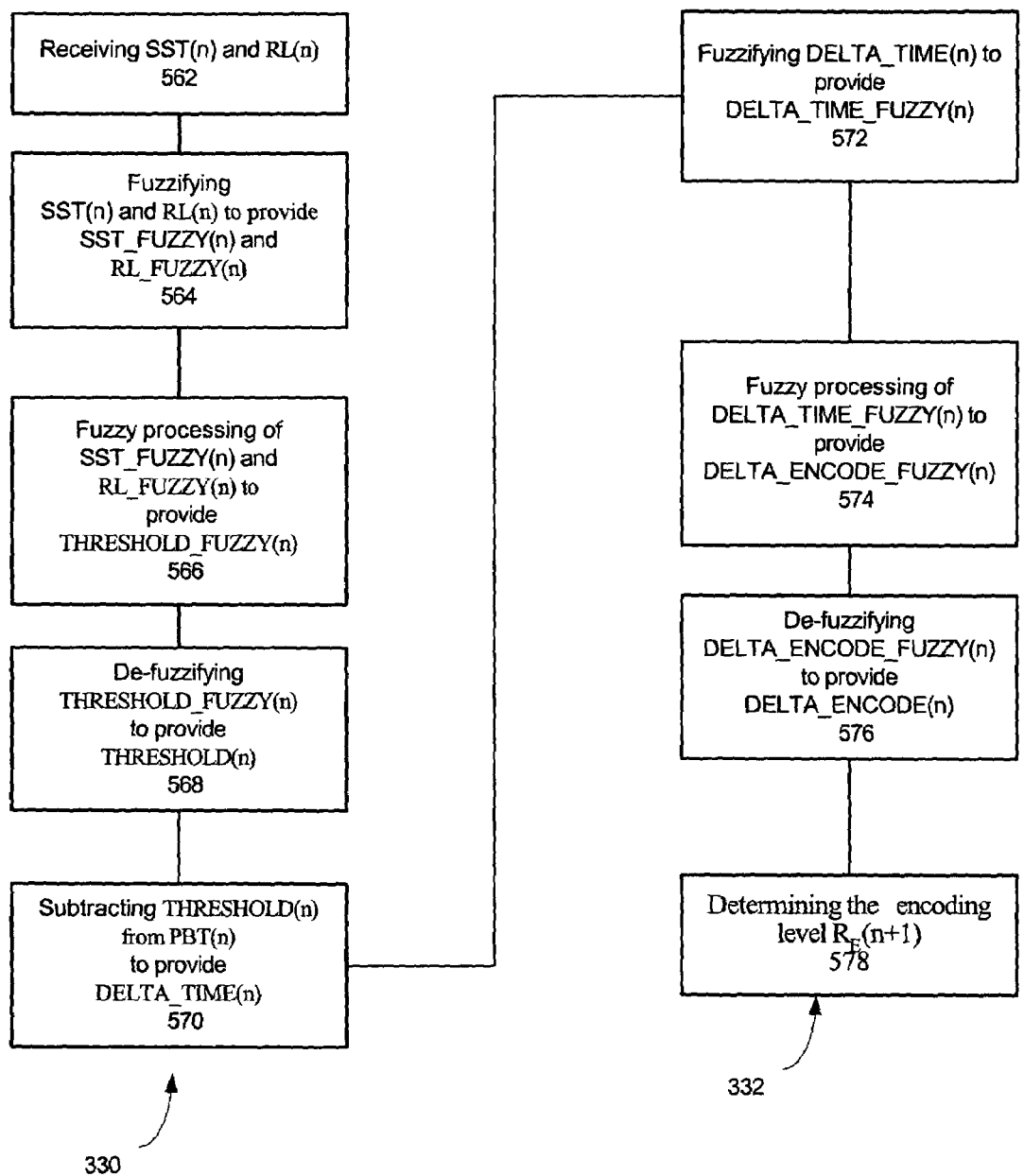

Referring to FIG. 6, process 330 receives (step 562 of FIG. 11) as input crisp variables SST(n) and RL(n). These variables are fuzzified (step 564 FIG. 11) by fuzzifying block 314 to provide two fuzzy input variables SST_FUZZY(n) and RL_FUZZY(n). The fuzzifying block may utilize various membership functions, such as membership functions LR (low risk 301 of FIG. 8a), MR (medium risk 303 of FIG. 8a) and HR (high risk 305 of FIG. 8a) for NS_FUZZY(n), and membership functions ST (start of streaming process 311 of FIG. 8b), MD (middle of streaming process 313 of FIG. 8b) and END (end of streaming process 315 of FIG. 8b) for SST_FUZZY(n).

The fuzzy input variables are provided to fuzzy decision making block 318 that may apply various rule based decisions (step 566 FIG. 11), such as those described at Table 6, to provide fuzzy output variable THRESHOLD_FUZZY(n). The fuzzy output variable THRESHOLD_FUZZY(n) may have the following values: LO (low occupancy), MO (medium occupancy) and HO (high occupancy):

TABLE 6

| SST_FUZZY(n)/NS_FUZZY(n) | ST | MD | END |
|---|---|---|---|
| LR | LO | MO | LO |
| MR | LO | MO | LO |
| HR | MO | HO | MO |

THRESHOLD_FUZZY(n) is de-fuzzified (step 568 FIG. 11) by de-fuzzifying block 322 to provide a crisp output variable THRESHOLD(n). THRESHOLD(n) is subtracted (step 570 FIG. 11) from PBT(n) to provide crisp input variable DELTA_TIME(n).

The second process 332 starts by fuzzifying DELTA_TIME(n) (step 572 FIG. 11) by fuzzifying block 324 to provide fuzzy input variable DELTA_TIME_FUZZY(n), using membership functions such as triangular shaped membership functions BTH (below threshold), WTH (about threshold) and ATH (above threshold).

DELTA_TIME_FUZZY(n) is provided to fuzzy decision making block 328 that may apply various rule based decisions (step 574 FIG. 11), such as those described at Table 7, to provide fuzzy output variable DELTA_ENCODE_FUZZY(n).

TABLE 7

| DELTA_TIME_FUZZY(n) | DELTA_ENCODE_FUZZY(n) |
|---|---|
| BTH | BSR |
| WTH | ESR |
| ATH | ASR |

DELTA_ENCODE_FUZZY(n) is de-fuzzified (step 576 FIG. 11) by block 332 to provide crisp output variable DELTA_ENCODE(n). DELTA_ENCODE(n) and the next streaming rate $R_S(n+1)$ are provided to an encoding level block 246 that determines (step 578 FIG. 11) what shall be the next encoding level $R_E(n+1)$.

Additional Embodiments

According to another aspect of the invention additional information regarding the media stream can be provided to the fuzzy logic process mentioned above, or even to other fuzzy logic control processes, in order to further optimize the propagation of content through a sequence of buffers.

According to this embodiment various media stream segments (such as different scenes) are initially processed to determine a target size of their compressed and/or encoded representation. The target size reflects a certain compression level. In response to said determination the media stream segments are then encoded. This two-staged process can be used for allocating more bits to segments that includes more information.

Assuming, for example, that a media stream is processed by a compression scheme such as one of the MPEG schemes. During a first processing step the media stream is analyzed.

During a second step the results of the analysis (such as media stream characteristics) are used for optimizing the media stream compression. The optimization may be responsive to various criteria such as media stream perceptual quality, media stream average quality level, allowed segment quality changes, and the like.

The results of the first step may include required (relative or absolute) bit size per media stream segment. One method for such multi step processing is described at "Two-pass MPEG-2 variable bitrate encoding", P. H. Westerink R. Rajagopalan C. A. Gonzales, IBM Journal of Research and Development, Volume 43(4), July 1999 which is incorporated herein by reference. Said article also discusses certain techniques to prevent player buffer overflow or underflow.

It is noted that the allocation of different bit amounts (rates) per scene can also take into account the smoothing properties of various buffers, such as the player buffer. The bit rate may fluctuate even in constant bit rate transmission, as long as the long-term average remaining substantially unchanged.

The flexible allocation of bit rate from one scene to another is limited by the available network bandwidth, and in many cases is limited by average bit rate requirements.

This flexible allocation of bit rate may facilitate allocating a larger amount of bit rates to a complex scene that is preceded by a simple scene.

According to an embodiment of the invention the results of the first pass and/or the processed representation of the media stream (after the second pass) may be used to determine player buffer target occupancy levels. For example, wherever the size of a certain frame is high the target player buffer occupancy level may be decreased, and vice verse.

The changes in the player buffer target occupancy level may also be responsive to the risk level associated with the network.

The alteration of target occupancy levels in response to the results of the first pass (or size of processed media stream after the second pass) can be useful when a complex frame (or scene) is preceded by a simple frame (or scene) and wherein the timing of both frames (or scenes) allows the player buffer to store both frames (or scenes).

According to another embodiment of the invention the fuzzy logic process may be further responsive to additional information reflecting the network policy rules/behavior.

This additional information may reflect either input variables provided to the fuzzy logic processes or even the processes themselves. For example such an additional information may be used to update the network bit-rate variable.

The additional information may reflect bit rate allocation among different parts of the network. For example, a network management entity can allocate network bandwidth in response to end users buffer occupancy, network buffer occupancy level, end user priority and the like. Accordingly, network buffers that are maintained at a first occupancy level may be allocated more bandwidth than network buffers that are maintained at a different occupancy level.

The inventors found that the ability to influence the bandwidth allocation given by the network through controlling the network buffer, allows the network management entities to control the relative bandwidth allocation among group of users, while maintaining the total bandwidth essentially constant and/or while maintaining some constraint or dependency among the allocations made to different users, for example, making sure that the total bandwidth will be essentially constant. This can be used for quality of service differentiation among different clients even if all use the same bandwidth as far as the agreement with the carrier goes.

The inventors have also found that by using two-pass encoding on a group of clients, the variable relative allocation can be used to temporarily allocate more bandwidth for transmitting certain scenes to a certain client in relation to another transmission aimed to another client. Said extended bandwidth allocation can be used for transmitting higher encoding level scenes.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

We claim:

1. A method for encoding video comprising:
   determining at least one signal sequence characteristic of a signal sequence that propagates through at least three cascaded buffers, wherein said determining comprises:
   providing status information reflecting a status of at least a third buffer and a second buffer of said at least three buffers; and
   applying at least one fuzzy logic process to determine the at least one characteristic of the signal sequence, in response to the status information.

2. The method of claim 1 wherein at least one cascaded buffer reflects buffering properties of a network through which the signal sequence propagates.

3. The method of claim 2 wherein the network comprises a cellular network.

4. The method of claim 2 wherein the signal sequence propagates through the network at a packetized form.

5. The method of claim 1 wherein the signal sequence is a video stream.

6. The method of claim 1 wherein the three cascaded buffers comprise a client device buffer.

7. The method of claim 1 wherein the three cascaded buffers comprise a client device buffer and whereas at least one cascaded buffer reflects buffering properties of a network through which the signal sequence propagates.

8. The method of claim 1 wherein the signal sequence is associated with timing information.

9. The method of claim 8 wherein the timing information reflects signal sequence portion retrieval from at least one of the cascaded buffers.

10. The method of claim 1 wherein the signal sequence is preprocessed prior a provision to the second cascaded buffer and wherein the at least one signal sequence characteristic comprises preprocessing characteristic.

11. The method of claim 1 wherein the at least one signal sequence characteristic is a signal sequence target bit rate, a signal sequence compression ratio or a signal sequence encoding level.

12. The method of claim 1 wherein the status information reflects occupancy of at least a second buffer.

13. The method of claim 1 wherein the status information reflects timing information associated with signal sequence portions stored within a second buffer or a third buffer.

14. The method of claim 1 wherein the signal sequence is a packetized media stream.

15. The method of claim 14 wherein the packetized media stream propagates through a network modeled by a buffer.

16. The method of claim 14 wherein the packetized media stream is compressed or encoded prior the transmission towards the network.

17. The method of claim 14 wherein the packetized media stream is sent to a client device buffer.

18. The method of claim 17 wherein media stream packets stored at the client device buffer are retrieved according to timing information associated with these packets.

19. The method of claim 1 wherein the status information reflects a progress of signal sequence propagation across the cascaded buffers.

20. The method of claim 1 wherein the step of applying comprises:
   receiving crisp input information representative of an occupancy of the second buffer; and
   applying a fuzzy logic process to output crisp output information representative of a change in a retrieval rate out of the first buffer.

21. The method of claim 20 wherein the signal sequence is a packetized media stream and the retrieval rate out of the first buffer is a streaming rate of the packetized media stream.

22. The method of claim 1 wherein the step of applying comprises:
   receiving crisp input information relating to signal sequence portions that were retrieved from the first buffer; and
   applying a fuzzy logic process to output crisp output information representing an encoding level of the signal sequence.

23. The method of claim 1 wherein the step of applying comprises:
   receiving crisp input information representative of an occupancy of the second buffer, of a retrieval rate of the second buffer and of an occupancy of the third buffer; and
   applying a fuzzy logic process to provide crisp output information representative of a retrieval rate from the first buffer.

24. The method of claim 23 wherein the signal sequence is a packetized media stream and the retrieval rate out of the first buffer is a streaming rate of the packetized media stream.

25. The method of claim 1 wherein the step of applying comprises:
   receiving crisp input information representative of timing associated with a retrieval of signal sequence portions from the third buffer; and applying a fuzzy logic process to provide an encoding level of the signal sequence portions.

26. The method of claim 1 wherein the step of applying comprises:
receiving crisp information representative of a progress of the propagation of the signal sequence, and of an ability to propagate the signal sequence through the cascaded buffers; and
applying a fuzzy logic process to provide crisp output information reflecting timing information of signal sequence portions stored within the third buffer.

27. The method of claim 1 wherein the step of applying comprises:
receiving crisp input information reflecting timing information of signal sequence portions stored within the third buffer; and
applying a fuzzy logic process to provide crisp output information representative of a difference between a retrieval rate out of the first buffer and an encoding level of the signal sequence.

28. The method of claim 1 further comprising a preliminary step of analyzing the signal sequence and wherein the fuzzy logic process is also responsive to a result of the analysis.

29. The method of claim 28 wherein the signal sequence is a media stream and wherein the result of the analysis is an allocation of bits per media stream segment.

30. A method for encoding video comprising: determining multiple signal sequence characteristics of a signal sequence that propagates through at least two cascaded buffers, wherein said determining comprises:
providing status information reflecting a status of at least two cascaded buffers; and
applying at least one fuzzy logic process to determine multiple characteristics of the signal sequence, in response to the status information.

31. The method of claim 30 wherein at least one cascaded buffer reflects buffering properties of a network through which the signal sequence propagates.

32. The method of claim 30 wherein the network comprises a cellular network.

33. The method of claim 30 wherein the signal sequence propagates through the network at a packetized form.

34. The method of claim 30 wherein the signal sequence is a media stream.

35. The method of claim 30 wherein at least two cascaded buffers comprise a client device buffer.

36. The method of claim 30 wherein the at least two cascaded buffers comprise a client device buffer and whereas at least one cascaded buffer reflects buffering properties of a network through which the signal sequence propagates.

37. The method of claim 30 wherein the signal sequence is associated with timing information.

38. The method of claim 37 wherein the timing information reflects signal sequence portion retrieval from at least one of the cascaded buffers.

39. The method of claim 30 wherein the signal sequence is preprocessed prior a provision to the first cascaded buffer and wherein multiple signal sequence characteristics comprise preprocessing characteristic.

40. The method of claim 30 wherein the preprocessing process is a compression process or an encoding process.

41. The method of claim 30 wherein the multiple signal sequence characteristics comprise a signal sequence target bit rate.

42. The method of claim 30 wherein the multiple signal sequence characteristics comprise signal sequence compression ratio or a signal sequence encoding level.

43. The method of claim 30 wherein the status information reflects occupancy of at least a first cascaded buffer.

44. The method of claim 30 wherein the status information reflects timing information associated with signal sequence portions stored within a first buffer or within the second buffer.

45. The method of claim 30 wherein the signal sequence is a packetized media stream.

46. The method of claim 45 wherein the packetized media stream propagates through a network modeled by a cascaded buffer and wherein the packetized media stream is sent to a client device buffer.

47. The method of claim 45 wherein the packetized media stream is compressed or encoded prior the transmission towards the network.

48. The method of claim 30 wherein the status information reflects a progress of signal sequence propagation across the cascaded buffers.

49. The method of claim 30 wherein the step of applying comprises: receiving crisp input information representative of an occupancy of the first buffer; and applying a fuzzy logic process to output crisp output information representative of a change in a provision rate of the signal sequence into the first cascaded buffer.

50. The method of claim 30 wherein the signal sequence is a packetized media stream and the provision rate is a streaming rate of the packetized media stream.

51. The method of claim 30 wherein the step of applying comprises: receiving crisp input information relating to signal sequence portions that were provided to the first buffer; and applying a fuzzy logic process to output crisp output information representing an encoding level of the signal sequence.

52. The method of claim 30 wherein the step of applying comprises: receiving crisp input information representative of timing associated with a retrieval of signal sequence portions from the second buffer; and applying a fuzzy logic process to provide an encoding level of the signal sequence portions.

53. The method of claim 30 wherein the step of applying comprises: receiving crisp information representative of a progress of the propagation of the signal sequence, and of an ability to propagate the signal sequence through the cascaded buffers; and applying a fuzzy logic process to provide crisp output information reflecting timing information of signal sequence portions stored within the second buffer.

54. The method of claim 30 wherein the step of applying comprises: receiving crisp input information reflecting timing information of signal sequence portions stored within the second buffer; and applying a fuzzy logic process to provide crisp output information representative of a difference between a provision rate to the first buffer and an encoding level of the signal sequence.

55. The method of claim 30 further comprising a preliminary step of analyzing the signal sequence.

56. The method of claim 55 wherein the fuzzy logic process is also responsive to a result of the analysis.

57. The method of claim 55 wherein the signal sequence is a media stream.

58. The method of claim 55 wherein the result of the analysis is an allocation of bits per media stream segment.

59. The method of claim 30 wherein the fuzzy logic process is also responsive to network policy rules.

60. The method of claim 30 wherein the fuzzy logic process is updated in response to previously determined characteristics.

61. The method of claim 60 wherein the update is implemented by neural networks.

62. The method of claim 30 wherein at least one characteristic is a transport layer characteristic and whereas at least one characteristic is an application layer characteristic.

63. A controller for encoding video comprising using at least one signal sequence characteristic of a signal sequence that propagates through at least three cascaded buffers, said controller comprises:
- a fuzzifying block, for receiving status information reflecting a status of at least a third buffer and a second buffer of said at least three buffers, and to fzzzify the status information to provide flizzified status information;
- a fuzzy decision making block, coupled between the fuzzifying block and a de-fuzzifying block, for processing the fiizzified status information to provide a flizzified output representative of at least one signal sequence characteristic of the signal sequence; and
- a de-fuzzifying block, for de-fuzzifying the fuzzified output.

64. The controller of claim 63 wherein at least one cascaded buffer reflects buffering properties of a network through which the signal sequence propagates.

65. The controller of claim 63 wherein the network comprises a cellular network.

66. The controller of claim 63 wherein the three cascaded buffers comprise a client device buffer.

67. The controller of claim 63 wherein the signal sequence is associated with timing information reflecting signal sequence portion retrieval from at least one of the cascaded buffers.

68. The controller of claim 63 wherein the signal sequence is preprocessed prior a provision to the second cascaded buffer and wherein the at least one signal sequence characteristic comprises preprocessing characteristic.

69. The controller of claim 63 wherein the fuzzifying block is adapted to receive crisp input information representative of an occupancy of the second buffer and to provide fuzzified status information; and wherein the fuzzy decision block receives said fuzzified status information and provides a fuzzified output signal representative of a change in a retrieval rate out of the first buffer.

70. The controller of claim 63 wherein the fuzzifying block is adapted to receive crisp input information relating to signal sequence portions that were retrieved from the first buffer and to provide fuzzified status information; and wherein the fuzzy decision block receives said fuzzified status information and provides a fuzzified output signal representing an encoding level of the signal sequence.

71. The controller of claim 63 wherein the fuzzifying block is adapted to receive crisp input information representative of timing associated with a retrieval of signal sequence portions from the third buffer and to provide fuzzified status information; and wherein the fuzzy decision block receives said ftizzified status information and provides a fuzzified output signal representative of an encoding level of the signal sequence portions.

72. The controller of claim 63 wherein the fuzzifying block is adapted to receive crisp input information representative of a progress of the propagation of the signal sequence, and of an ability to propagate the signal sequence through the cascaded buffers and to provide ftizzified status information; and wherein the fuzzy decision block receives said fuzzified status information and provides a fuzzified output signal reflecting timing information of signal sequence portions stored within the third buffer.

73. The controller of claim 63 wherein the fuzzifying block is adapted to receive crisp input information reflecting timing information of signal sequence portions stored within the third buffer and to provide fuzzified status information; and wherein the fuzzy decision block receives said fuzzified status information and provides a fuzzified output signal representative of a difference between a retrieval rate out of the first buffer and an encoding level of the signal sequence.

74. A controller for encoding video by determining multiple signal sequence characteristic of a signal sequence that propagates through at least two cascaded buffers, said controller comprises:
- a fuzzifying block, for receiving status information reflecting a status of at least a first and second buffers of said at least two buffers, and to fuzzify the status information to provide fuzzified status information;
- a fuzzy decision making block, coupled between the fuzzifying block and a de-fuzzifying block, for processing the fuzzified status information to provide a fuzzified output representative of multiple signal sequence characteristics of the signal sequence; and
- a de-fuzzifying block, for de-fuzzifying the fuzzified output.

75. The controller of claim 74 wherein at least one cascaded buffer reflects buffering properties of a network through which the signal sequence propagates.

76. The controller of claim 75 wherein the at least two cascaded buffers comprise a client device buffer.

77. The controller of claim 74 wherein the signal sequence is associated with timing information.

78. The controller of claim 77 wherein the timing information reflects signal sequence portion retrieval from at least one of the cascaded buffers.

79. The controller of claim 77 wherein the timing information reflects signal sequence portion retrieval from at least two cascaded buffers.

80. The controller of claim 77 wherein the signal sequence is preprocessed prior a provision to the first cascaded buffer.

81. The controller of claim 77 wherein the multiple signal sequence characteristics comprise preprocessing characteristic.

82. A system for transmitting a signal sequence towards an intermediate buffer and towards a target buffer, the system comprises:
- a status information providing means, for providing status information reflecting a status of at least the target buffer and the intermediate buffer;
- a controller, coupled to the status information providing means, for applying at least one fuzzy logic process to determine at least one signal sequence characteristic, in response to the status information; and
- signal sequence provider, for transmitting at least a signal sequence portion in response to the at least one signal sequence characteristic.

* * * * *